United States Patent
Jang et al.

(10) Patent No.: US 11,973,942 B2
(45) Date of Patent: *Apr. 30, 2024

(54) IMAGE ENCODING/DECODING METHOD AND APPARATUS FOR DETERMINING PREDICTION MODE OF CHROMA BLOCK BY REFERRING TO LUMA SAMPLE POSITION, AND METHOD FOR TRANSMITTING BITSTREAM

(71) Applicant: LG ELECTRONICS INC., Seoul (KR)

(72) Inventors: Hyeong Moon Jang, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,272

(22) Filed: Dec. 21, 2022

(65) Prior Publication Data

US 2023/0171401 A1 Jun. 1, 2023

Related U.S. Application Data

(63) Continuation of application No. 17/635,185, filed as application No. PCT/KR2020/010904 on Aug. 14, 2020, now Pat. No. 11,595,642.

(Continued)

(51) Int. Cl.
*H04N 19/119* (2014.01)
*H04N 19/11* (2014.01)
(Continued)

(52) U.S. Cl.
CPC ........... *H04N 19/11* (2014.11); *H04N 19/119* (2014.11); *H04N 19/132* (2014.11);
(Continued)

(58) Field of Classification Search
CPC .. H04N 19/139; H04N 19/543; H04N 19/157; H04N 19/176; H04N 19/132; H04N 19/119
See application file for complete search history.

(56) References Cited

U.S. PATENT DOCUMENTS 11,595,642 B2 * 2/2023 Jang ..................... H04N 19/119
2011/0038412 A1 2/2011 Jung ..................... H04N 19/23
375/240.12

(Continued)

FOREIGN PATENT DOCUMENTS

CN 102934446 A 2/2013
CN 103096066 A 5/2013
(Continued)

OTHER PUBLICATIONS

JVET-O0255-v1: Zhang et al., "Non-CE3: Fixed MPMs for MIP," "Joint Video Experts Team (JVET) of ITU-T SG 16 WP 3 and ISO/IEC JTC 1/SC 29/ WG11, 15th Meeting: Gothenburg, SE, Jul. 3-12, 2019, Bytedance Inc. (8 Pages).

(Continued)

*Primary Examiner* — Tsion B Owens
(74) *Attorney, Agent, or Firm* — Bryan Cave Leighton Paisner LLP

(57) ABSTRACT

An image encoding/decoding method and apparatus are provided. An image decoding method performed by an image decoding apparatus may comprise identifying a current chroma block by splitting an image, identifying whether a matrix based intra prediction mode applies to a first luma sample position corresponding to the current chroma block, identifying whether a predetermined prediction mode applies to a second luma sample position corresponding to the current chroma block, based on the matrix based intra prediction mode doing not apply, and determining an intra prediction mode candidate of the current chroma block (Continued)

based on an intra prediction mode applying to a third luma sample position corresponding to the current chroma block, based on the predetermined prediction mode doing not apply.

15 Claims, 20 Drawing Sheets

Related U.S. Application Data

(60) Provisional application No. 62/886,353, filed on Aug. 14, 2019.

(51) Int. Cl.
*H04N 19/132* (2014.01)
*H04N 19/167* (2014.01)
*H04N 19/176* (2014.01)
*H04N 19/186* (2014.01)
*H04N 19/593* (2014.01)

(52) U.S. Cl.
CPC ......... *H04N 19/167* (2014.11); *H04N 19/176* (2014.11); *H04N 19/186* (2014.11); *H04N 19/593* (2014.11)

(56) References Cited

U.S. PATENT DOCUMENTS

| | | | |
|---|---|---|---|
| 2014/0105290 A1 | 4/2014 | Kwon | H04N 19/105 375/240.12 |
| 2018/0241995 A1 | 8/2018 | Son et al. | |
| 2019/0208217 A1 | 7/2019 | Zhou et al. | |
| 2020/0177873 A1* | 6/2020 | Li | H04N 19/103 |
| 2020/0374528 A1* | 11/2020 | Huang | H04N 19/157 |
| 2021/0274184 A1 | 9/2021 | Park | H04N 19/132 |
| 2022/0109846 A1 | 4/2022 | Lim | H04N 19/186 |
| 2022/0116645 A1* | 4/2022 | Jang | H04N 19/109 |
| 2022/0150502 A1 | 5/2022 | Zhang | H04N 19/124 |

FOREIGN PATENT DOCUMENTS

| | | |
|---|---|---|
| CN | 107211147 A | 9/2017 |
| CN | 107396110 A | 11/2017 |
| EP | 3932065 A1 | 1/2022 |
| EP | 3994887 A1 | 5/2022 |
| KR | 20170103924 A | 9/2017 |
| KR | 20180026396 A | 3/2018 |
| KR | 20180126384 A | 11/2018 |
| KR | 20180135075 A | 12/2018 |
| WO | 2018062921 A1 | 4/2018 |
| WO | 2019059640 A1 | 3/2019 |
| WO | 2021013053 A1 | 1/2021 |
| WO | 2021023151 A1 | 2/2021 |

OTHER PUBLICATIONS

B. Bross et al., "Versatile Video Coding (Draft 6)", Joint Video Experts Team (JVET) of ITU-T SG 16 WP 3 and ISO/IEC JTC 1/SC 29/WG 11, Jul. 3-12, 2019, JVET-O2001-vE.

* cited by examiner

SPLIT_BT_VER    SPLIT_BT_HOR    SPLIT_TT_VER    SPLIT_TT_HOR

× : Location of luma sample
○ : Location of chroma sample

× : Location of luma sample
○ : Location of chroma sample

× : Location of luma sample
○ : Location of chroma sample

| seq_parameter_set_rbsp() { | Descriptor |
|---|---|
| sps_decoding_parameter_set_id | u(4) |
| sps_video_parameter_set_id | u(4) |
| sps_max_sublayers_minus1 | u(3) |
| sps_reserved_zero_5bits | u(5) |
| profile_tier_level(sps_max_sub_layers_minus1 ) | |
| gra_enabled_flag | u(1) |
| sps_seq_parameter_set_id | ue(v) |
| chroma_format_idc | ue(v) |
| if(chroma_format_idc == 3 ) | |
|    separate_colour_plane_flag | u(1) |
| ... | ... |

| chroma_format_idc | separate_colour_plane_flag | ChromaArrayType | Chroma format | SubWidthC | SubHeightC |
|---|---|---|---|---|---|
| 0 | 0 | 0 | Monochrome | 1 | 1 |
| 1 | 0 | 1 | 4:2:0 | 2 | 2 |
| 2 | 0 | 2 | 4:2:2 | 2 | 1 |
| 3 | 0 | 3 | 4:4:4 | 1 | 1 |
| 3 | 1 | 0 | 4:4:4 | 1 | 1 |

FIG. 20

| cclm_mode_flag | cclm_mode_idx | intra_chroma_pred_mode | lumaIntraPredMode | | | | |
|---|---|---|---|---|---|---|---|
| | | | 0 | 50 | 18 | 1 | X ( 0 <= X <= 66 ) |
| 0 | - | 0 | 66 | 0 | 0 | 0 | 0 |
| 0 | - | 1 | 50 | 66 | 50 | 50 | 50 |
| 0 | - | 2 | 18 | 18 | 66 | 18 | 18 |
| 0 | - | 3 | 1 | 1 | 1 | 66 | 1 |
| 0 | - | 4 | 0 | 50 | 18 | 1 | X |
| 1 | 0 | - | 81 | 81 | 81 | 81 | 81 |
| 1 | 1 | - | 82 | 82 | 82 | 82 | 82 |
| 1 | 2 | - | 83 | 83 | 83 | 83 | 83 |

FIG. 21

| mode X | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| mode Y | 0 | 1 | 61 | 62 | 63 | 64 | 65 | 66 | 2 | 3 | 4 | 6 | 8 | 10 | 12 | 13 | 14 | 16 |
| mode X | 18 | 19 | 20 | 21 | 22 | 23 | 24 | 25 | 26 | 27 | 28 | 29 | 30 | 31 | 32 | 33 | 34 | 35 |
| mode Y | 18 | 20 | 22 | 23 | 24 | 26 | 28 | 30 | 32 | 33 | 34 | 35 | 36 | 37 | 38 | 39 | 40 | 41 |
| mode X | 36 | 37 | 38 | 39 | 40 | 41 | 42 | 43 | 44 | 45 | 46 | 47 | 48 | 49 | 50 | 51 | 52 | 53 |
| mode Y | 42 | 43 | 44 | 44 | 44 | 45 | 46 | 46 | 46 | 47 | 48 | 48 | 48 | 49 | 50 | 51 | 52 | 52 |
| mode X | 54 | 55 | 56 | 57 | 58 | 59 | 60 | 61 | 62 | 63 | 64 | 65 | 66 | | | | | |
| mode Y | 52 | 53 | 54 | 54 | 54 | 55 | 56 | 56 | 56 | 57 | 58 | 59 | 60 | | | | | |

IMAGE ENCODING/DECODING METHOD AND APPARATUS FOR DETERMINING PREDICTION MODE OF CHROMA BLOCK BY REFERRING TO LUMA SAMPLE POSITION, AND METHOD FOR TRANSMITTING BITSTREAM

CROSS-REFERENCE TO RELATED APPLICATIONS

This application is a Continuation Application of U.S. patent application Ser. No. 17/635,185, filed Feb. 14, 2022, which is a National Stage filing under 35 U.S.C. 371 of International Application No. PCT/KR2020/010904, with an international filing date of Aug. 14, 2020, which claims the benefit of U.S. Provisional Application No. 62/886,353, filed on Aug. 14, 2019, all of which are incorporated by reference in their entirety herein.

TECHNICAL FIELD

The present disclosure relates to an image encoding/decoding method and apparatus, and, more particularly, to an image encoding/decoding method and apparatus for determining an intra prediction mode of a chroma block, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

An object of the present disclosure is to provide an image encoding/decoding method and apparatus for improving encoding/decoding efficiency by determining a prediction mode of a chroma block by referring to a smaller number of luma sample positions.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise identifying a current chroma block by splitting an image, identifying whether a matrix based intra prediction mode applies to a first luma sample position corresponding to the current chroma block, identifying whether a predetermined prediction mode applies to a second luma sample position corresponding to the current chroma block, based on the matrix based intra prediction mode not being applied, and determining an intra prediction mode candidate of the current chroma block based on an intra prediction mode applying to a third luma sample position corresponding to the current chroma block, based on the predetermined prediction mode not being applied. The predetermined prediction mode is an IBC (intra block copy) mode or a palette mode.

The first luma sample position may be determined based on at least one of a width or height of a luma block corresponding to the current chroma block. The first luma sample position may be determined based on a top-left sample position of a luma block corresponding to the current chroma block, a width of the luma block and a height of the luma block. The first luma sample position may be the same as the third luma sample position.

The second luma sample position may be determined based on at least one of a width or height of a luma block corresponding to the current chroma block. The second luma sample position may be determined based on a top-left sample position of a luma block corresponding to the current chroma block, a width of the luma block and a height of the luma block. The second luma sample position may be the same as the third luma sample position.

The first luma sample position, the second luma sample position and the third luma sample position may be the same.

The first luma sample position may be a center position of a luma block corresponding to the current chroma block. An x component position of the first luma sample position may be determined by adding half the width of the luma block to an x component position of a top-left sample of a luma block corresponding to the current chroma block, and a y component position of the first luma sample position may be determined by adding half the height of the luma block to a y component position of the top-left sample of the luma block corresponding to the current chroma block.

The first luma sample position, the second luma sample position and the third luma sample position may be determined based on a top-left sample position of a luma block corresponding to the current chroma block, a width of the luma block and a height of the luma block, respectively.

In addition, an image decoding apparatus according to an aspect of the present disclosure may comprise a memory and at least one processor. The at least one processor may identify a current chroma block by splitting an image, identify whether a matrix based intra prediction mode applies to a first luma sample position corresponding to the current chroma block, identify whether a predetermined prediction mode applies to a second luma sample position corresponding to the current chroma block, based on the matrix based intra prediction mode not being applied, and determine an intra prediction mode candidate of the current chroma block based on an intra prediction mode applying to a third luma sample position corresponding to the current chroma block, based on the predetermined prediction mode not being applied.

In addition, an image encoding method performed by an image encoding apparatus according to an aspect of the present disclosure may comprise identifying a current chroma block by splitting an image, identifying whether a matrix based intra prediction mode applies to a first luma sample position corresponding to the current chroma block, identifying whether a predetermined prediction mode applies to a second luma sample position corresponding to the current chroma block, based on the matrix based intra prediction mode not being applied, and determining an intra prediction mode candidate of the current chroma block based on an intra prediction mode applying to a third luma sample position corresponding to the current chroma block, based on the predetermined prediction mode not being applied.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by determining a prediction mode of a chroma block by referring to a smaller number of luma sample positions.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIGS. 20 and 21 are views illustrating a reference table for determining a chroma intra prediction mode.

MODE FOR INVENTION

Figure 1:
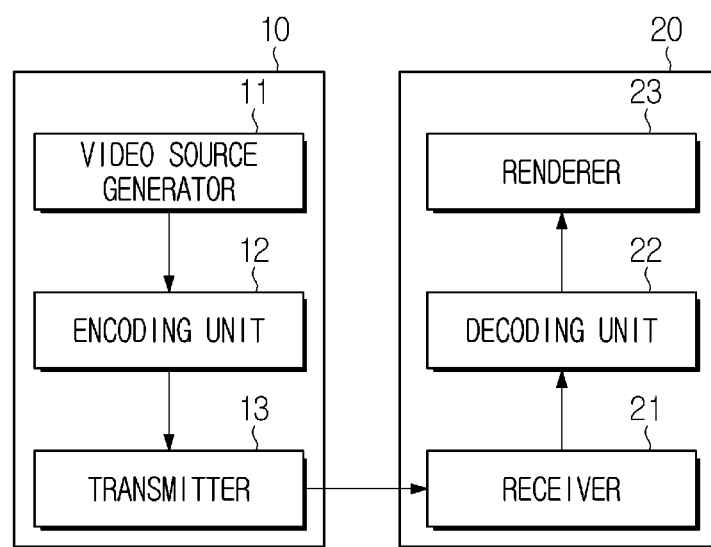
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
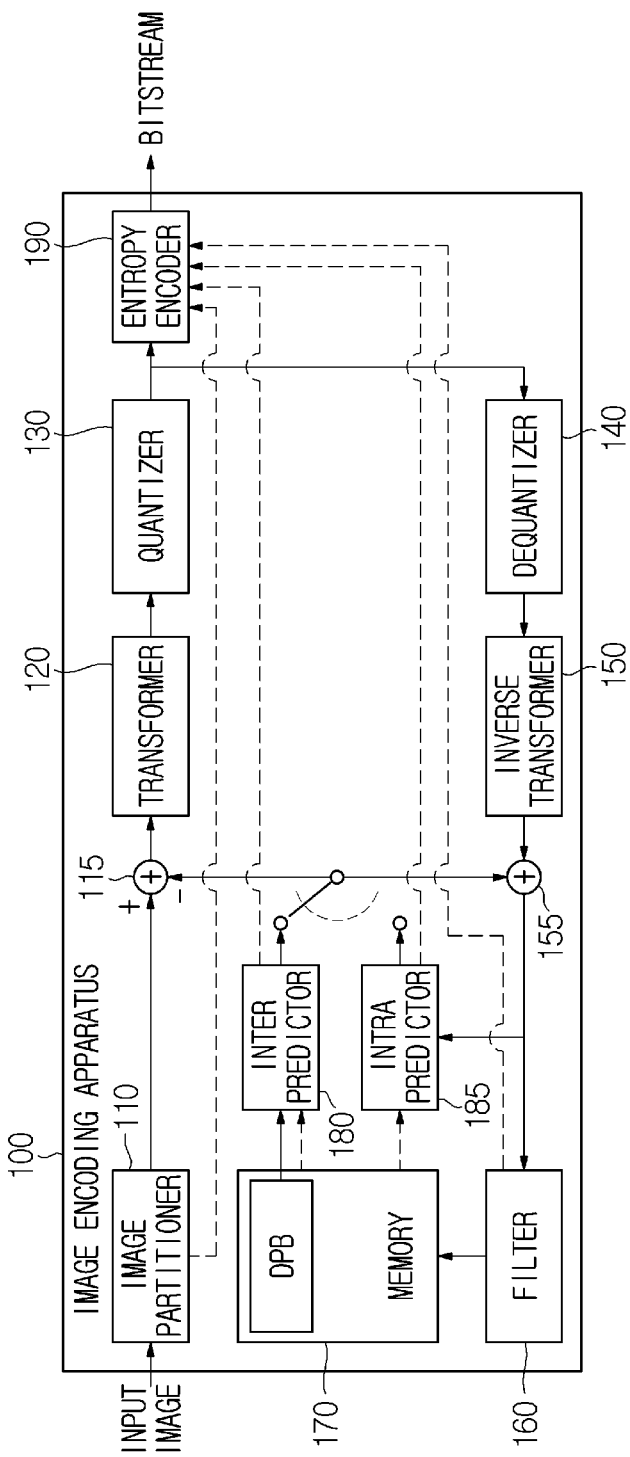
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
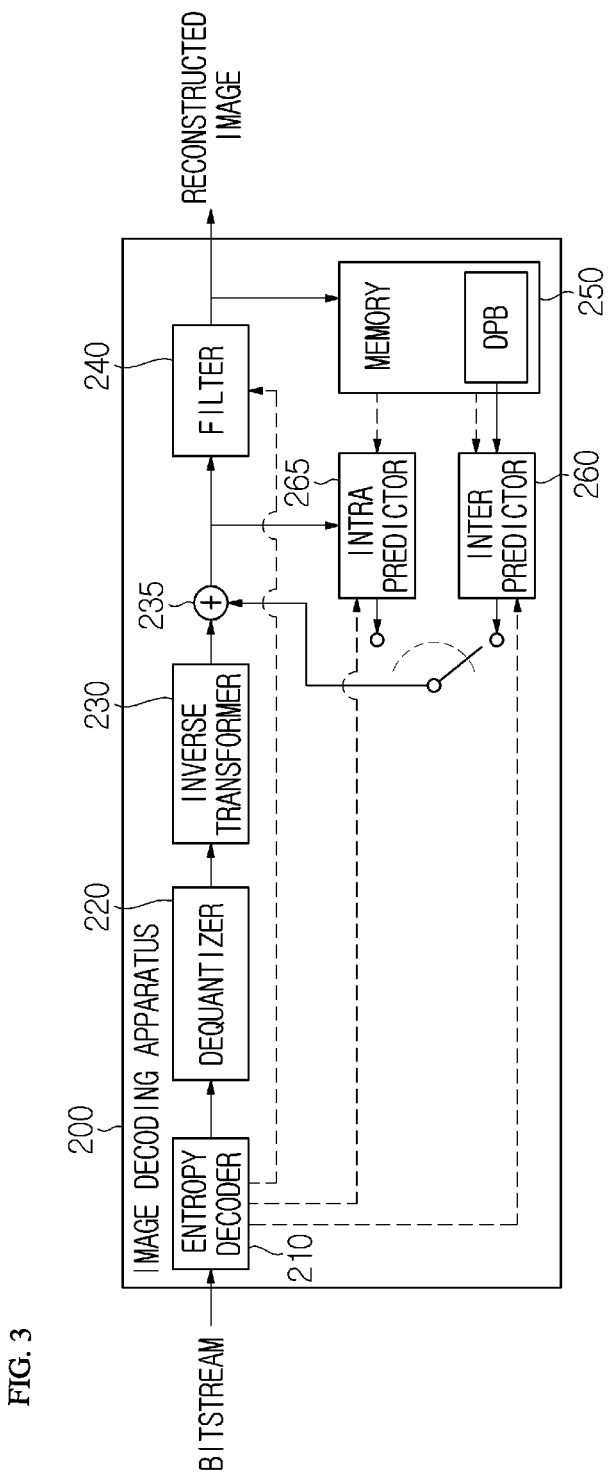
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Figure 4:
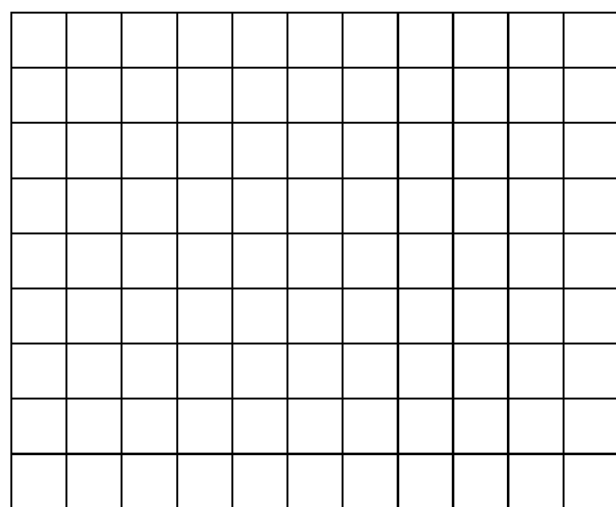
FIG. 4 is a view showing a partitioning structure of an image according to an embodiment.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

Figure 5:
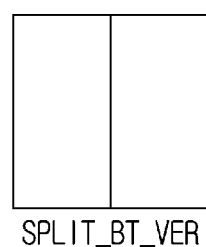
FIG. 5 is a view showing an embodiment of a partitioning type of a block according to a multi-type tree structure.
Figure 5:
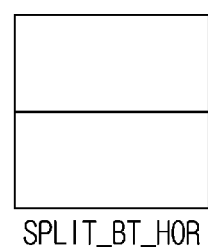
Figure 5:
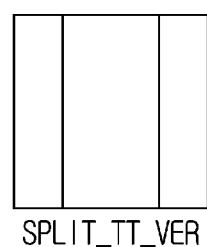
Figure 5:
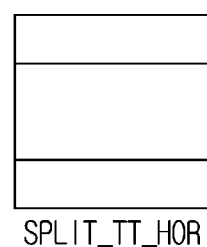

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
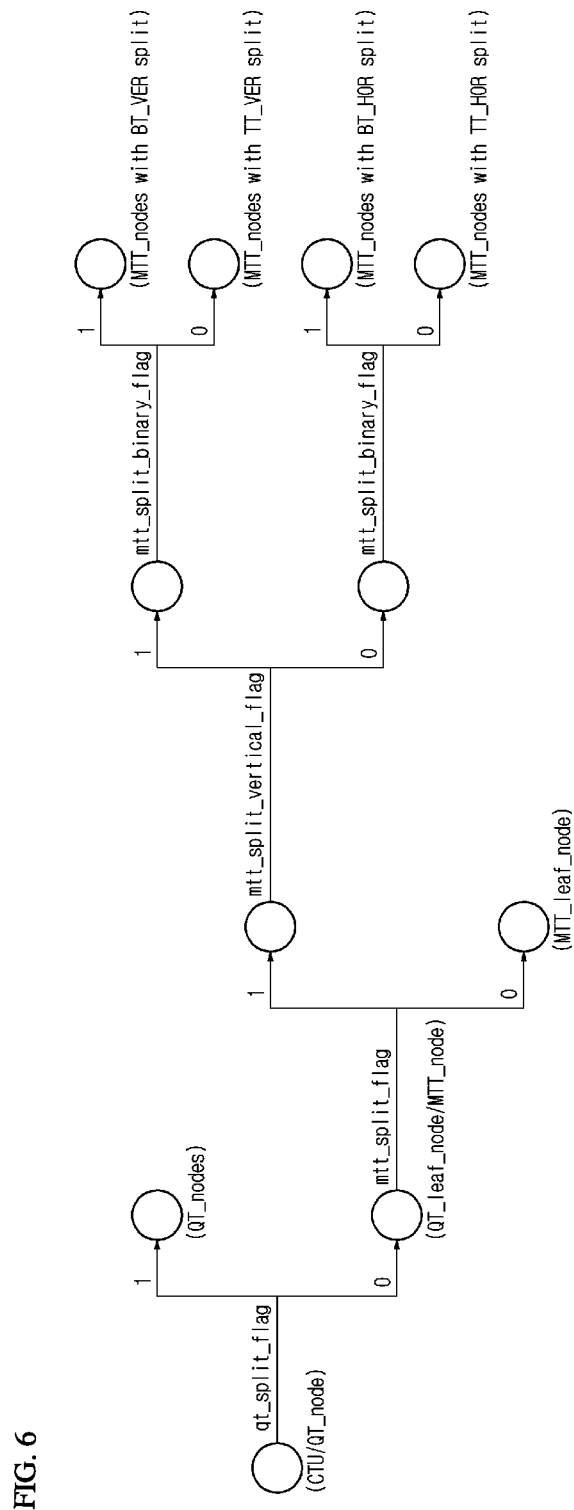
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
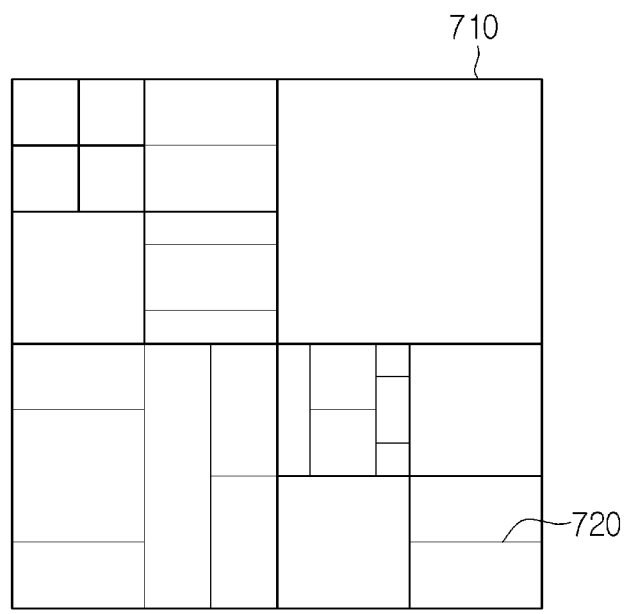
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Figure 8:
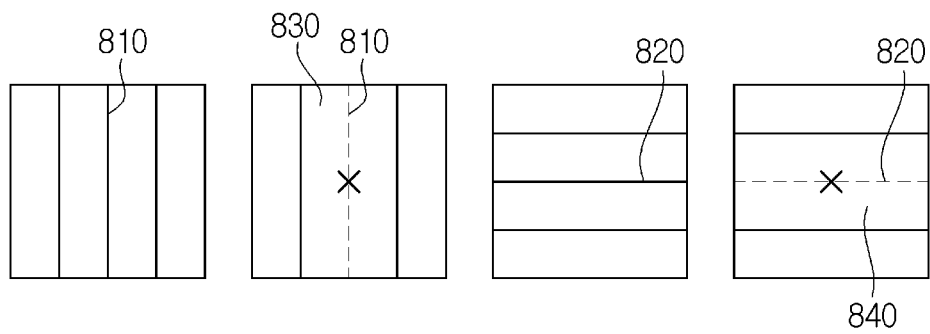
FIG. 8 is a view illustrating an embodiment of a redundant splitting pattern.

For example, FIG. 8 shows redundant splitting patterns which may occur in binary tree splitting and ternary tree splitting. As shown in FIG. 8, continuous binary splitting 810 and 820 for one direction of two-step levels have the same coding block structure as binary splitting for a center partition after ternary splitting. In this case, binary tree splitting for center blocks 830 and 840 of ternary tree splitting may be prohibited. this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 8, when binary tree splitting for the center block of the CU is prohibited, a syntax element mtt_split_cu_binary_flag specifying whether splitting is binary splitting or ternary splitting is not signaled and the value thereof may be derived as 0 by a decoding apparatus.

Overview of Chroma Format

Hereinafter, a chroma format will be described. An image may be encoded into encoded data including a luma component (e.g., Y) array and two chroma component (e.g., Cb and Cr) arrays. For example, one pixel of the encoded image may include a luma sample and a chroma sample. A chroma format may be used to represent a configuration format of the luma sample and the chroma sample, and the chroma format may be referred to as a color format.

In an embodiment, an image may be encoded into various chroma formats such as monochrome, 4:2:0, 4:2:2 or 4:4:4. In monochrome sampling, there may be one sample array and the sample array may be a luma array. In 4:2:0 sampling, there may be one luma sample array and two chroma sample arrays, each of the two chroma arrays may have a height equal to half that of the luma array and a width equal to half that of the luma array. In 4:2:2 sampling, there may be one luma sample array and two chroma sample arrays, each of the two chroma arrays may have a height equal to that of the luma array and a width equal to half that of the luma array. In 4:4:4 sampling, there may be one luma sample array and two chroma sample arrays, and each of the two chroma arrays may have a height and width equal to those of the luma array.

Figure 9:
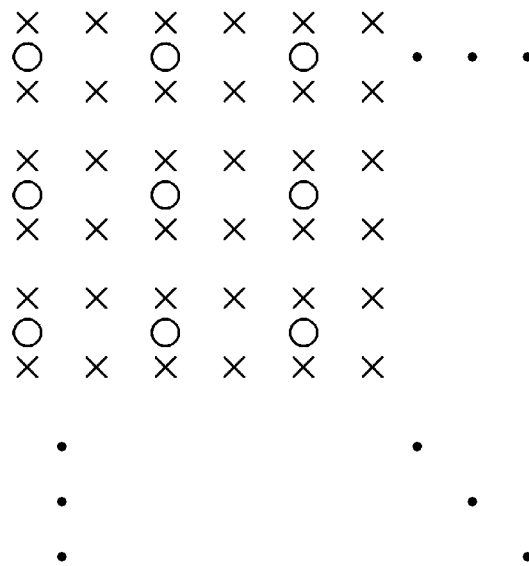
FIGS. 9 to 11 are views illustrating a positional relationship between a luma sample and a chroma sample determined according to a chroma format according to an embodiment.
Figure 10:
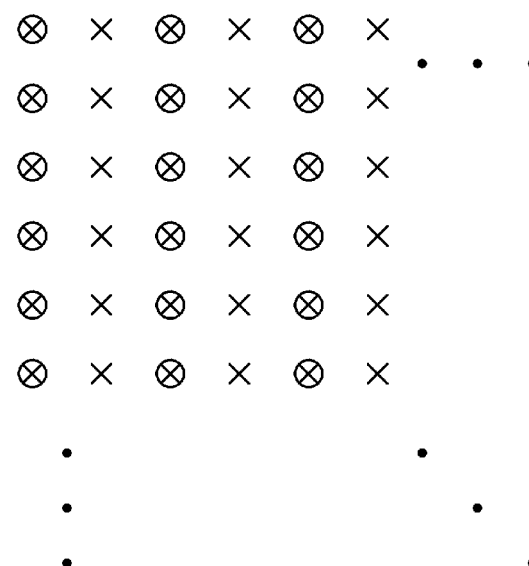
Figures 11, 12:
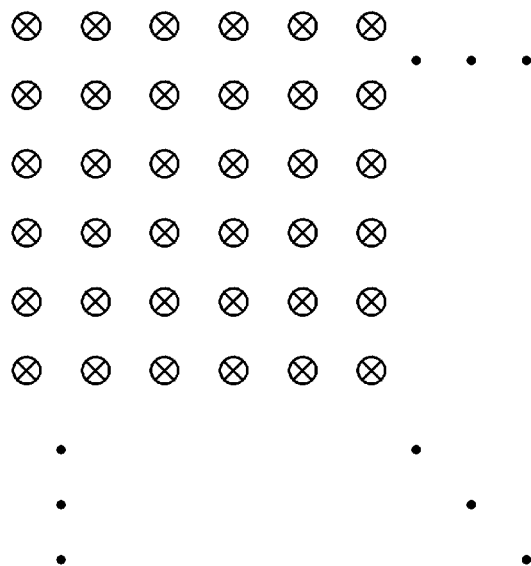
FIG. 12 is a view illustrating syntax for chroma format signaling according to an embodiment.

FIG. 9 is a view illustrating a relative position according to an embodiment of a luma sample and a chroma block according to 4:2:0. FIG. 10 is a view illustrating a relative position according to an embodiment of a luma sample and a chroma block according to 4:2:2. FIG. 11 is a view illustrating a relative position according to an embodiment of a luma sample and a chroma block according to 4:4:4. As shown in FIG. 9, in 4:2:0 sampling, a chroma sample may be located below a luma sample corresponding thereto. As shown in FIG. 10, in 4:2:2 sampling, a chroma sample may be located to overlap a luma sample corresponding thereto. As shown in FIG. 11, in 4:4:4 sampling, both a luma sample and a chroma sample may be located at an overlapping position.

A chroma format used in an encoding apparatus and a decoding apparatus may be predetermined. Alternatively, a chroma format may be signaled from an encoding apparatus to a decoding apparatus to be adaptively used in the encoding apparatus and the decoding apparatus. In an embodiment, the chroma format may be signaled based on at least one of chroma_format_idc or separate_colour_plane_flag. At least one of chroma_format_idc or separate_colour_plane_flag may be signaled through higher level syntax such as DPS, VPS, SPS or PPS. For example, chroma_format_idc and separate_colour_plane_flag may be included in SPS syntax shown in FIG. 12.

Figures 13, 14:
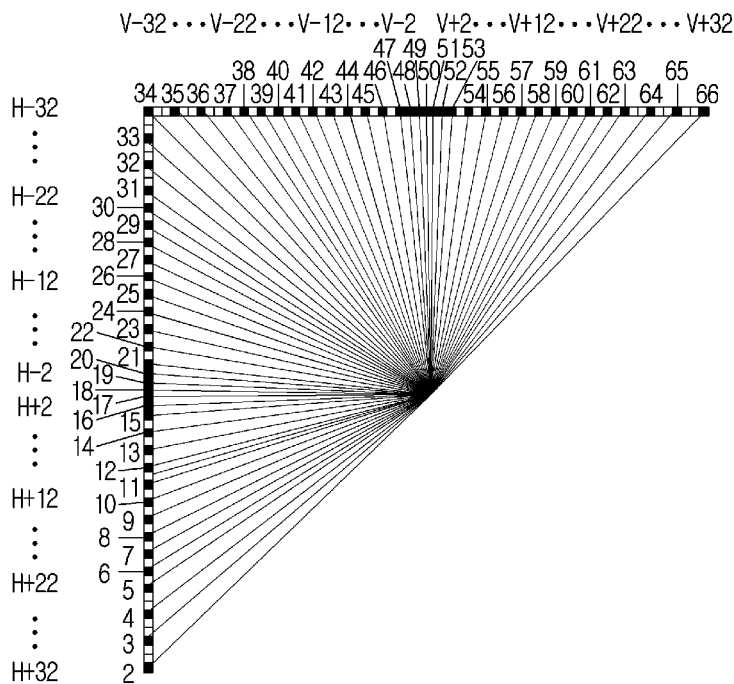
FIG. 13 is a view illustrating a chroma format classification table according to an embodiment.
FIGS. 14 and 15 are views illustrating a directional intra prediction mode according to an embodiment.

Meanwhile, FIG. 13 shows an embodiment of chroma format classification using signaling of chroma_format_idc and separate_colour_plane_flag. chroma_format_idc may be information specifying a chroma format applying to an encoded image. separate_colour_plane_flag may specify whether a color array is separately processed in a specific chroma format. For example, a first value (e.g., 0) of chroma_format_idc may specify monochrome sampling. A second value (e.g., 1) of chroma_format_idc may specify 4:2:0 sampling. A third value (e.g., 2) of chroma_format_idc may specify 4:2:2 sampling. A fourth value (e.g., 3) of chroma_format_idc may specify 4:4:4 sampling.

In 4:4:4, the following may apply based on the value of separate_colour_plane_flag. If the value of separate_colour_plane_flag is a first value (e.g., 0), each of two chroma arrays may have the same height and width as a luma array. In this case, a value of ChromaArrayType specifying a type of a chroma sample array may be set equal to chroma_format_idc. If the value of separate_colour_plane_flag is a second value (e.g., 1), luma, Cb and Cr sample arrays may be separately processed and processed along with monochrome-sampled pictures. In this case, ChromaArrayType may be set to 0.

Overview of Intra Prediction Mode

Hereinafter, the intra prediction mode will be in greater detail. FIG. 14 shows an intra prediction direction according to an embodiment. In order to capture any edge direction presented in natural video, as shown in FIG. 14, the intra prediction mode may include two non-directional intra prediction modes and 65 directional intra prediction modes. The non-directional intra prediction modes may include a planar intra prediction mode and a DC intra prediction mode, and the directional intra prediction modes may include second to 66$^{th}$ intra prediction modes.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, upper samples or both thereof are considered for LM parameter derivation and may be applied only to a chroma component. For example, the intra prediction mode may be indexed according to the intra prediction mode value as shown in the following table.

TABLE 2

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

Figure 15:
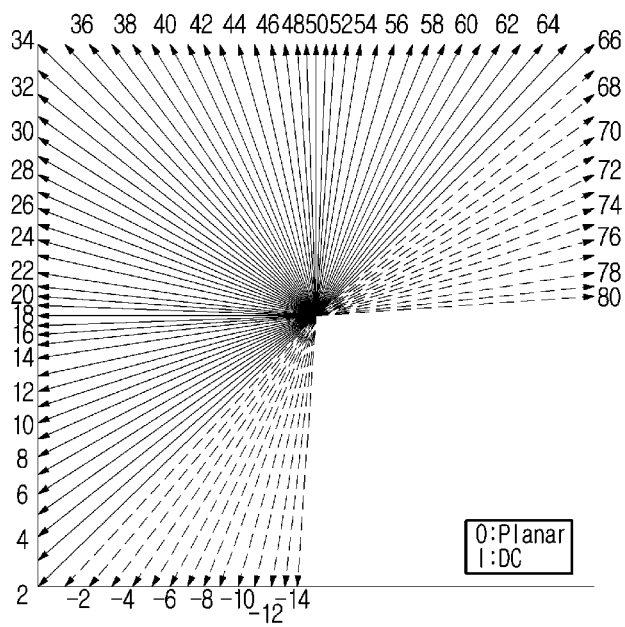

FIG. 15 shows an intra prediction direction according to another embodiment. Here, a dotted-line direction shows a wide angle mode applied only to a non-square block. As shown in FIG. 15, in order to capture any edge direction presented in natural video, the intra prediction mode according to an embodiment may include two non-directional intra prediction modes and 93 directional intra prediction modes. The non-directional intra prediction modes may include a planar intra prediction mode and a DC intra prediction mode, and the directional intra prediction modes may include Intra prediction modes 2 to 80 to 1 to −14, as denoted by arrow of FIG. 15. The planar prediction mode may be denoted by INTRA_PLANAR, and the DC prediction mode may be denoted by INTRA_DC. In addition, the directional intra prediction mode may be denoted by INTRA_ANGULAR−14 to INTRA_ANGULAR−1 and INTRA_ANGULAR2 to INTRA_ANGULAR80. Meanwhile, the intra prediction type (or the additional intra prediction mode) may include at least one of LIP, PDPC, MRL, ISP or MIP. The intra prediction type may be indicated based on intra prediction type information, and the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and, if applied, which reference sample line is used, ISP flag information (e.g., intra_subpartitions_mode_flag) indicating whether the ISP is applied to the current block, ISP type information (e.g., intra_subpartitions_split_flag) indicating the split type of the sub-partitions when the ISP is applied, flag information indicating whether PDPC is applied, flag information indicating whether LIP is applied or MIP flag information indicating whether MIP is applied.

The intra prediction mode information and/or the intra prediction type information may be encoded/decoded using a coding method described in the present disclosure. For example, the intra prediction mode information and/or the intra prediction type information may be encoded/decoded based on a truncated (rice) binary code through entropy coding (e.g., CABAC, CAVLC).

When intra prediction is performed on a current block, prediction on a luma component block (luma block) of the current block and prediction on a chroma component block (chroma block) may be performed. In this case, the intra prediction mode for the chroma block may be set separately from the intra prediction mode for the luma block.

For example, the intra prediction mode for the chroma block may be specified based on intra chroma prediction mode information, and the intra chroma prediction mode information may be signaled in the form of an intra_chroma_pred_mode syntax element. For example, the intra chroma prediction mode information may represent one of a planar mode, a DC mode, a vertical mode, a horizontal mode, a derived mode (DM), and a CCLM mode. Here, the planar mode may specify intra prediction mode #0, the DC mode may specify intra prediction mode #1, the vertical mode may specify intra prediction mode #26, and the horizontal mode may specify intra prediction mode #10. DM may also be referred to as a direct mode. The CCLM may also be referred to as an LM.

Meanwhile, the DM and the CCLM are dependent intra prediction modes for predicting the chroma block using information on the luma block. The DM may represent a mode in which the same intra prediction mode as the intra prediction mode for the luma component applies as the intra prediction mode for the chroma component. In addition, the CCLM may represent an intra prediction mode using, as the prediction samples of the chroma block, samples derived by subsampling reconstructed samples of the luma block and then applying α and β which are CCLM parameters to subsampled samples in a process of generating the prediction block for the chroma block.

Overview of MIP

A matrix based intra prediction (MIP) mode may also be referred to as an affine linear weighted intra prediction (ALWIP) mode, a linear weighted intra prediction (LWIP) mode or a matrix weighted intra prediction (MWIP) mode. An intra prediction mode other than matrix based prediction may be defined as a non-matrix based prediction mode. For example, the non-matrix based prediction mode may be referred to as non-directional intra prediction and directional intra prediction. Hereinafter, as the term to refer to the non-matrix based prediction mode, an intra prediction mode or a normal intra prediction may be used interchangeably. Hereinafter, matrix based prediction may be referred to as an MIP mode.

When the MIP mode applies for the current block, i) neighboring reference samples on which an averaging step is performed may be used, ii) a matrix-vector-multiplication step may be performed, iii) if necessary, a horizontal/vertical interpolation may be further performed, thereby deriving prediction samples of the current block.

Figure 16:
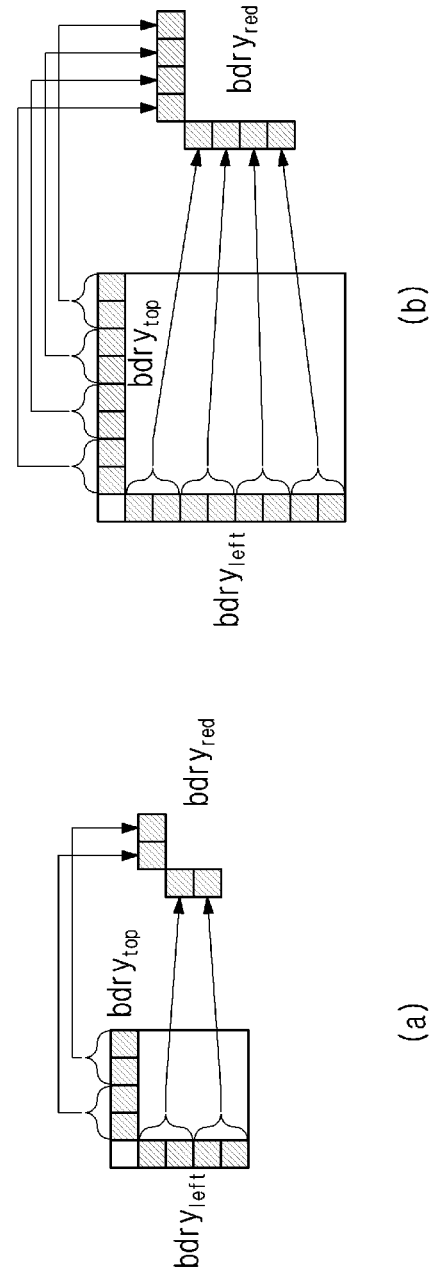
FIGS. 16 and 17 are reference views illustrating an MIP mode according to an embodiment.

The averaging step may be performed by averaging the values of neighboring samples. The averaging procedure may be performed by taking averaging of each boundary and generating a total of four samples including two top samples and two left samples when the width and width of the current block are 4 in pixel units as shown in (a) of FIG. 16 and may be performed by taking averaging of each boundary and generating a total of eight samples including four top samples and four left samples when the width and width of the current block are not 4 in pixel units as shown in (b) of FIG. 16.

The matrix-vector-multiplication step may be performed by multiplying an averaged sample by a matrix vector and then adding an offset vector, thereby generating a prediction signal for a subsampled pixel set of an original block. The size of the matrix and the offset vector may be determined according to the width and width of the current block.

Figure 17:
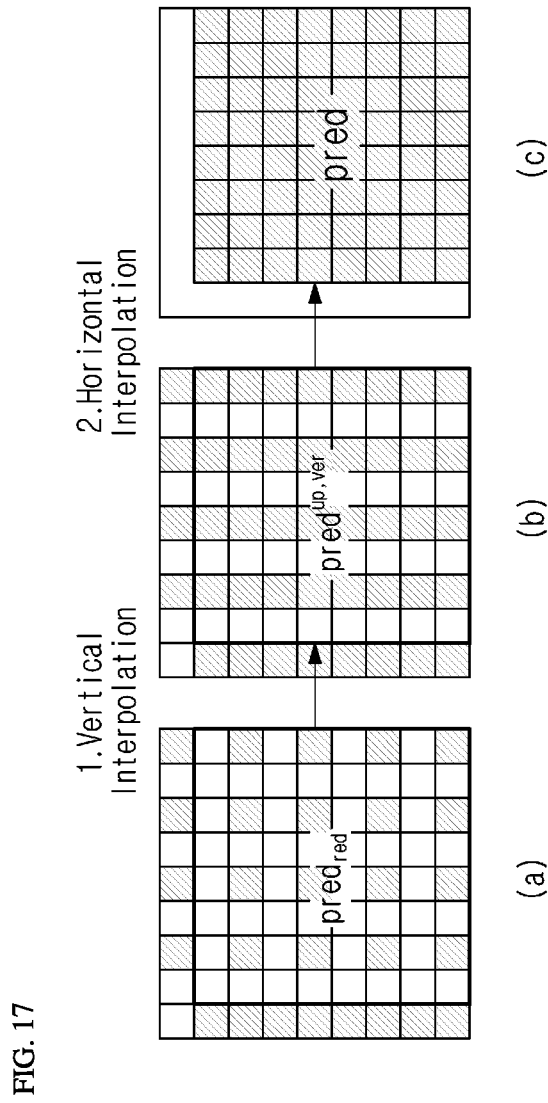

The horizontal/vertical interpolation step is a step of generating the prediction signal of an original block size from the subsampled prediction signal. As shown in FIG. 17, the prediction signal of the original block size may be generated by performing vertical and horizontal interpolation using a subsampled prediction signal and a neighboring pixel value. FIG. 17 shows an embodiment of performing MIP prediction with respect to an 8×8 block. In case of the 8×8 block, as shown in (b) of FIG. 16, a total of eight averaged samples may be generated. By multiplying eight averaged samples by a matrix vector and adding an offset vector, as shown in (a) of FIG. 17, 16 sample values may be generated an even-number coordinate position. Thereafter, as shown in (b) of FIG. 17, vertical interpolation may be performed using an average value of top samples of the current block. Thereafter, as shown in (c) of FIG. 17, horizontal interpolation may be performed using the left sample of the current block.

Intra prediction modes used for the MIP mode may be constructed differently from intra prediction modes used for the above-described LIP, PDPC, MRL and ISP intra prediction or normal intra prediction. The intra prediction mode for the MIP mode may be called an MIP intra prediction mode, an MIP prediction mode or an MIP mode. For example, a matrix and offset used for the matrix-vector-multiplication may be differently set according to the intra prediction mode for MIP. Here, the matrix may be called an (MIP) weight matrix, and the offset may be called an (MIP) offset vector or (MIP) bias vector.

The above-described intra prediction type information may include an MIP flag (e.g., intra_mip_flag) specifying whether the MIP mode applies to the current block. intra_mip_flag[x0] [y0] may specify whether the current block is predicted in an MIP mode. For example, a first value (e.g., 0) of intra_mip_flag[x0][y0] may specify that the current block is not predicted in the MIP mode. A second value (e.g., 1) of intra_mip_flag[x0][y0] may specify that the current block is predicted in the MIP mode.

When intra_mip_flag[x0][y0] has a second value (e.g., 1), information on the MIP mode may be further obtained from a bitstream. For example, intra_mip_mpm_flag[x0] [y0], intra_mip_mpm_idx[x0][y0] and intra_mip_mpm_remainder [x0][y0] syntax elements which are information specifying the MIP mode of the current block may be further obtained from the bitstream. When an MIP prediction mode applies to the current block, an MPM list for MIP may be constructed, and the intra_mip_mpm_flag may specify whether the MIP mode for the current block is present in the MPM list for MIP (or MPM candidates). The intra_mip_mpm_idx may specify the index of a candidate used as the MIP prediction mode of the current block among the candidates in the MPM list, when the MIP prediction mode for the current block is present in the MPM list for MIP (that is, when the value of intra_mip_mpm_flag is 1). intra_mip_mpm_remainder may specify the MIP prediction mode of the current block when the MIP prediction mode for the current block is not present in the MPM list for MIP (that is, when the value of intra_mip_mpm_flag is 0), and specify any one of all MIP prediction modes or specify any one of the remaining modes except for the candidate mode in the MPM list for MIP among all the MIP prediction modes as the MIP prediction mode of the current block.

Meanwhile, when intra_mip_flag[x0][y0] has a first value (e.g., 0), information on MIP may not be obtained from the bitstream and intra prediction information other than MIP may be obtained from the bitstream. In an embodiment, intra_luma_mpm_flag[x0][y0] specifying whether an MPM list for normal intra prediction is generated may be obtained from the bitstream.

When the intra prediction mode applies to the current block, an MPM list therefor may be constructed, intra_luma_mpm_flag may specify an intra prediction mode for the current block is present in the MPM list (or MPM candidates). For example, a first value (e.g., 0) of intra_luma_mpm_flag may specify that the intra prediction mode of the current block is not present in the MPM list. A second value (e.g., 1) of intra_luma_mpm_flag may specify that the intra prediction mode of the current block is present in the MPM list. When the value of intra_luma_mpm_flag is 1, the intra_luma_not_planar_flag may be obtained from the bitstream.

intra_luma_not_planar_flag may specify whether the intra prediction mode of the current block is a planar mode or not. For example, a first value (e.g., 0) of intra_luma_not_planar_flag may specify that the intra prediction mode of the current block is a planar mode. A second value (e.g., 1) of intra_luma_not_planar_flag may specify that the intra prediction mode of the current block is not a planar mode.

intra_luma_mpm_idx may be parsed and coded when intra_luma_not_planar_flag is 'true' (that is, value 1). In an embodiment, a planar mode may always be included in the MPM list as a candidate. However, as described above, the planar mode may be excluded from the MPM list by first signaling intra_luma_not_planar_flag, and, in this case, a unified MPM list may be constructed in the above-described various intra prediction types (normal intra prediction, MRL, ISP, LIP, etc.). In this case, the number of candidates in the MPM list may be reduced to 5. intra_luma_mpm_idx may specify candidates used as the intra prediction mode of the current block among the candidates included in the MPM list from which the planar mode is excluded.

Meanwhile, when the value of intra_luma_mpm_flag is 0, the intra_luma_mpm_remainder may be parsed/coded. intra_luma_mpm_remainder may specify one of all the intra prediction modes as the intra prediction mode of the current block or may specify any one of the remaining modes except for the candidate modes in the MPM list as the intra prediction mode of the current block.

Overview of Palette Mode

Hereinafter, a palette mode (PLT mode) will be described. An encoding apparatus according to an embodiment may encode an image using a palette mode, and a decoding apparatus may decode an image using a palette mode in a manner corresponding thereto. The palette mode may be called a palette encoding mode, an intra palette mode, an intra palette encoding mode, etc. The palette mode may be regarded as a type of intra encoding mode or may be regarded as one of intra prediction methods. However, similarly to the above-described skip mode, a separate residual value for the corresponding block may not be signaled.

In an embodiment, the palette mode may be used to improve encoding efficiency in encoding screen content which is an image generated by a computer including a significant amount of text and graphics. In general, a local area of the image generated as screen content is separated by sharp edges, and is expressed with a small number of colors. In order to utilize this characteristic, in the palette mode, samples for one block may be expressed by indices specifying a color entry of the palette table.

To apply a palette mode, information on a palette table may be signaled. In an embodiment, the palette table may include an index value corresponding to each color. To signal the index value, palette index prediction information may be signaled. The palette index prediction information may include an index value for at least a portion of a palette index map. In the palette index map, pixels of video data may be mapped to color indices of the palette table.

The palette index prediction information may include run value information. For at least a portion of the palette index map, the run value information may associate a run value with an index value. One run value may be associated with an escape color index. The palette index map may be generated from the palette index prediction information. For example, at least a portion of the palette index map may be generated by determining whether to adjust the index value of the palette index prediction information based on a last index value.

A current block in a current picture may be encoded or reconstructed according to the palette index map. When applying the palette mode, a pixel value in a current coding unit may be expressed as a small set of representative color values. Such a set may be called a palette. For pixels having a value close to a palette color, the palette index may be signaled. For pixels having a value which does not belong to (is out of) the palette, the corresponding pixels may be denoted by an escape symbol and a quantized pixel value may be directly signaled. In this document, a pixel or a pixel value may be described as a sample.

In order to decode a block encoded in the palette mode, a decoding apparatus may decode a palette color and an index. The palette color may be described in the palette table, and may be encoded using a palette table coding tool. An escape flag may be signaled for each coding unit. The escape flag may specify whether an escape symbol is present in a current coding unit. If the escape symbol is present, the palette table may be increased by 1 unit (e.g., index unit) and a last index may be designated as an escape mode. The palette indices of all pixels for one coding unit may configure the palette index map, and may be encoded using a palette index map coding tool.

For example, in order to encode the palette table, a palette predictor may be maintained. The palette predictor may be initialized at a start point of each slice. For example, the palette predictor may be reset to 0. For each entry of the palette predictor, a reuse flag specifying whether it is a portion of a current palette may be signaled. The reuse flag may be signaled using run-length coding of a value of 0.

Thereafter, numbers for new palette entries may be signaled using a zero-order exponential Golomb code. Finally, component values for a new palette entry may be signaled. After encoding a current coding unit, the palette predictor may be updated using the current palette, and an entry from a previous palette predictor which is not reused in the current palette (until reaching an allowed maximum size) may be added to an end of a new palette predictor and this may be referred to as palette stuffing.

Figure 18:
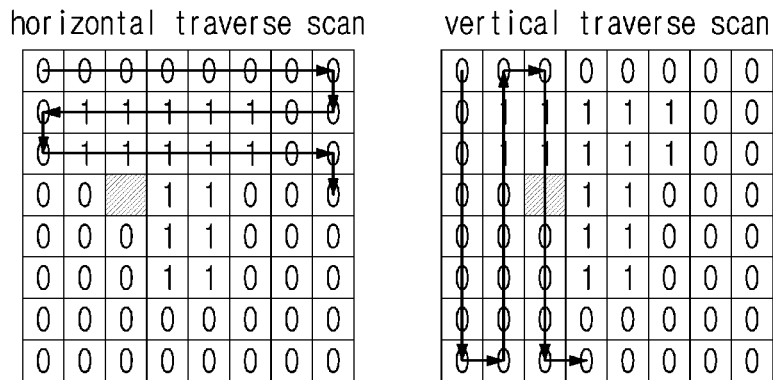
FIG. 18 is a view illustrating an embodiment of horizontal scan and vertical scan according to an embodiment.

For example, in order to encode the palette index map, indices may be encoded using horizontal or vertical scan. A scan order may be signaled through a bitstream using palette_transpose_flag which is a parameter specifying a scan direction. For example, when horizontal scan applies to scan indices for samples in a current coding unit, palette_transpose_flag may have a first value (e.g., 0) and when vertical scan applies, palette_transpose_flag may have a second value (e.g., 1). FIG. 18 shows an embodiment of horizontal scan and vertical scan according to an embodiment.

In addition, in an embodiment, the palette index may be encoded using an 'INDEX' mode and a 'COPY_ABOVE' mode. Except for the case where the mode of the palette index is signaled for an uppermost row when horizontal scan is used, the case where the mode of the palette index is signaled for a leftmost column when vertical scan is used, and the case where an immediately previous mode is 'COPY_ABOVE', the two modes may be signaled using one flag.

In an 'INDEX' mode, the palette index may be explicitly signaled. For a 'INDEX' mode and a 'COPY_ABOVE' mode, a run value specifying the number of pixels encoded using the same mode may be signaled.

An encoding order for an index map may be set as follows. First, the number of index values for a coding unit may be signaled. This may be performed after signaling of an actual index value for the entire coding unit using truncated binary coding. Both the number of indices and the index values may be coded in a bypass mode. Through this, bypass bins related to the index may be grouped. Then, the palette mode (INDEX or COPY_ABOVE) and the run value may be signaled using an interleaving method.

Finally, component escape values corresponding to escape samples for the entire coding unit may be mutually grouped and encoded in a bypass mode. last_run_type_flag which is an additional syntax element may be signaled after signaling the index value. By using last_run_type_flag along with the number of indices, signaling of a run value corresponding to a last run in the block may be skipped.

In an embodiment, a dual tree type, in which independent coding unit partitioning is performed on a luma component and a chroma component, may be used for an I slice. The palette mode may apply to the luma component and the chroma component individually or together. If the dual tree does not apply, the palette mode is applicable to all Y, Cb and Cr components.

Overview of IBC (Intra Block Copy) Mode

IBC prediction may be performed by the prediction unit of the image encoding apparatus/image decoding apparatus. The IBC prediction may be simply called IBC. The IBC may be used for content image/moving image such as game, for example, SCC (screen content coding). The IBC prediction is basically performed within a current picture but may be performed similarly to inter prediction in that a reference block is derived within the current picture. That is, IBC may use at least one of the inter prediction techniques described in the present disclosure. For example, in IBC, at least one of the above-described motion information (motion vector) derivation methods may be used. At least one of the inter prediction techniques may be partially modified and used in consideration of the IBC prediction. The IBC may refer to a current picture and thus may be referred to as current picture referencing (CPR).

For IBC, the image encoding apparatus may derive an optimal block vector (or motion vector) for a current block (e.g., CU) by performing block matching (BM). The derived block vector (or motion vector) may be signaled to the image decoding apparatus through a bitstream using a method similar to signaling of motion information (motion vector) in the above-described inter prediction. The image decoding apparatus may derive a reference block for the current block within the current picture through the signaled block vector (motion vector) and derive a prediction signal (predicted block or prediction samples) for the current block through this. Here, the block vector (or motion vector) may represent displacement from the current block to the reference block located in an already reconstructed area in the current picture. Accordingly, the block vector (or motion vector) may be called a displacement vector. Hereinafter, in IBC, the motion vector may correspond to the block vector or the displacement vector. The motion vector of the current block may include a motion vector (luma motion vector) for a luma component and a motion vector (chroma motion vector) for a chroma component. For example, the luma motion vector for an IBC-coded CU may be an integer sample unit (that is, integer precision). The chroma motion vector may also be clipped in integer sample units. As described above, IBC may use at least one of inter prediction techniques, and, for example, the luma motion vector may be encoded/decoded using the above-described merge mode or MVP mode.

When the merge mode applies to a luma IBC block, a merge candidate list for the luma IBC block may be constructed similarly to a merge candidate list in an inter mode. However, in the case of the luma IBC block, a temporal neighboring block may not be used as a merge candidate.

When an MVP mode applies to the luma IBC block, an mvp candidate list for the luma IBC block may be constructed similar to an mvp candidate list in an inter mode. However, in the case of the luma IBC block, a temporal candidate block may not be used as an mvp candidate.

In IBC, a reference block is derived from an already reconstructed area within the current picture. In this case, in order to reduce memory consumption and complexity of the image decoding apparatus, only a predefined area of the already reconstructed area within the current picture may be referenced. The predefined area may include a current CTU in which the current block is included. By limiting a referenceable reconstructed area to the predefined area, an IBC mode may be implemented in hardware using a local on-chip memory.

The image encoding apparatus for performing IBC may determine a reference block having smallest RD cost by searching the predefined area, and derive a motion vector (block vector) based on the positions of the reference block and the current block.

Whether IBC applies to the current block may be signaled as IBC performance information at a CU level. Information on a signaling method (IBC MVP mode or IBC skip/merge mode) of a motion vector of a current block may be signaled. IBC performance information may be used to determine the prediction mode of the current block. Accordingly, IBC performance information may be included in the information on the prediction mode of the current block.

In the case of the IBC skip/merge mode, a merge candidate index may be signaled and used to specify a block vector to be used for prediction of a current luma block among block vectors included in the merge candidate list. In this case, the merge candidate list may include neighboring blocks encoded in IBC. The merge candidate list may include a spatial merge candidate, and may be constructed not to include a temporal merge candidate. In addition, the merge candidate list may further include an HMVP (history-based motion vector predictor) candidate and/or a pairwise candidate.

In the case of the IBC MVP mode, a block vector difference value may be encoded using the same method as the motion vector difference value of the above-described inter mode. A block vector prediction method may construct and use an mvp candidate list including two candidates as a predictor similar to the MVP mode of the inter mode. One of the two candidates may be derived from a left neighboring block and the other may be derived from a top neighboring block. In this case, only when the left or top neighboring block is encoded in IBC, the candidate may be derived from the corresponding neighboring block. If the left or top neighboring block is not available, for example, if it is not encoded in IBC, a default block vector may be included in the mvp candidate list as a predictor. In addition, it is similar to the MVP mode of the inter mode that information (e.g., flag) specifying one of two block vector predictors is signaled and used as candidate selection information. The mvp candidate list may include an HMVP candidate and/or a zero motion vector as a default block vector.

The HMVP candidate may be referred to as a history based MVP candidate, and an MVP candidate, merge candidate or block vector candidate used before encoding/decoding of the current block may be stored in the HMVP list as HMVP candidates. Thereafter, when the merge candidate list or mvp candidate list of the current block does not include a maximum number of candidates, a candidate stored in the HMVP list may be added to the merge candidate list or mvp candidate list of the current block as an HMVP candidate.

The pairwise candidate means a candidate derived by selecting two candidates from among the candidates already included in the merge candidate list of the current block according to a predetermined order and averaging the selected two candidates.

Intra Prediction for Chroma Block

When intra prediction is performed on a current block, prediction for a luma component block (luma block) and prediction for a chroma component block (chroma block) of the current block may be performed, and, in this case, an intra prediction mode for the chroma block may be set separately from an intra prediction mode for the luma block.

Figure 19:
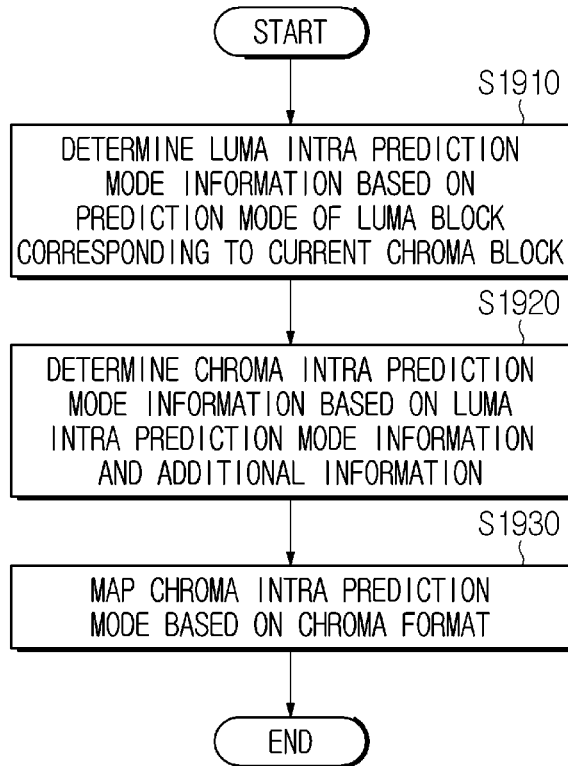
FIG. 19 is a view illustrating an intra prediction mode determination method of a chroma block according to an embodiment.

The intra prediction mode for the chroma block may be determined based on the intra prediction mode of the luma block corresponding to the chroma block. FIG. 19 is a view illustrating an intra prediction mode determination method of a chroma block according to an embodiment.

A method of determining an intra prediction mode of a chroma block by an encoding/decoding apparatus according to an embodiment will be described with reference to FIG. 19. Hereinafter, the decoding apparatus will be described and the description thereof may apply to the encoding apparatus without change.

According to the following description, the intra prediction mode IntraPredModeC[xCb][yCb] for the chroma block may be derived, and the following parameters may be used in this process.

luma sample coordinates (xCb, yCb) specifying a relative position of a top-left sample of a current chroma block with respect to a position of a top-left luma sample of a current picture cbWidth specifying a width of a current coding block in a luma sample unit cbHeight specifying a height of a current coding block in a luma sample unit In addition, the following description may be used when a current slice including a current chroma block is an I slice and a luma/chroma dual tree splitting structure applies. However, the following description is not limited to the above example. For example, the following description may apply regardless of whether the current slice is an I slice, and the following description is commonly applicable even when it is not a dual tree splitting structure.

First, the decoding apparatus may determine luma intra prediction mode information (e.g., lumaIntraPredMode) based on the prediction mode of the luma block corresponding to the current chroma block (S1910). This step will be described in detail below.

Next, the decoding apparatus may determine chroma intra prediction mode information based on luma intra prediction mode information and additional information (S1920). In an embodiment, the decoding apparatus may determine a chroma intra prediction mode, based on a cclm_mode_flag parameter specifying whether to apply a CCLM prediction mode obtained from a bitstream, a cclm_mode_idx parameter specifying a CCLM mode type applied when the CCLM prediction mode applies, an intra_chroma_pred_mode parameter specifying an intra prediction mode type applying to a chroma sample and luma intra prediction mode information (e.g., lumaIntraPredMode) and a table of FIG. 20.

For example, the intra_chroma_pred_mode may specify one of a planar mode, a DC mode, a vertical mode, a horizontal mode, a DM (Derived Mode) and a CCLM (Cross-component linear model) mode. Here, the planar mode may specify Intra prediction mode 0, the DC mode may specify Intra prediction mode 1, the vertical mode may specify Intra prediction mode 26, and the vertical mode may specify Intra prediction mode 10. DM may also be referred to as a direct mode. CCLM may also be referred to as an LM (linear model). The CCLM mode may include at least one of L_CCLM, T_CCLM or LT_CCLM.

Meanwhile, DM and CCLM are dependent intra prediction modes in which a chroma block is predicted using information on a luma block. DM may specify a mode in which the same intra prediction mode as an intra prediction mode of a luma block corresponding to a current chroma block applies as the intra prediction mode for the chroma block. In the DM mode, the intra prediction mode of the current chroma block may be determined as the intra prediction mode specified by the luma intra prediction mode information.

In addition, CCLM may specify an intra prediction mode in which, in a process of generating a prediction block of a chroma block, reconstructed samples of a luma block are subsampled and then samples derived by applying CCLM parameters a and R to the subsampled samples are used as prediction samples of the chroma block.

Next, the decoding apparatus may map a chroma intra prediction mode based on a chroma format (S1930). The decoding apparatus according to an embodiment may map a chroma intra prediction mode X determined according to the table of FIG. 20 to a new chroma intra prediction mode Y based on the table of FIG. 21, only when the chroma format is 4:2:2 (e.g., when the value of chroma_format_idc is 2). For example, when the value of the chroma intra prediction mode determined according to the table of FIG. 20 is 16, this may be mapped to Chroma intra prediction mode 14 according to the mapping table of FIG. 21.

Determination of Luma Intra Prediction Mode Information

Figure 22:
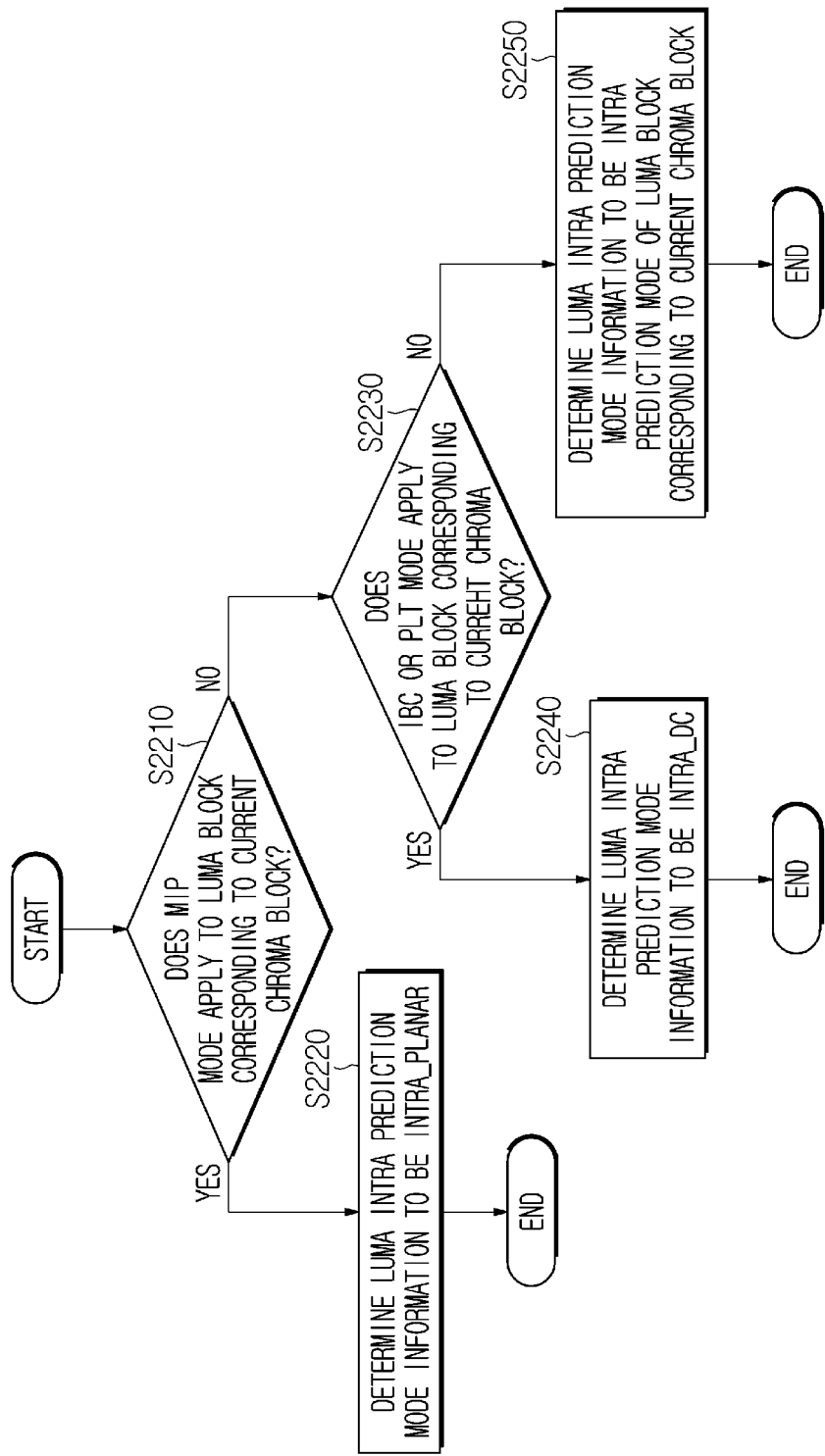
FIGS. 22 to 25 are flowcharts illustrating a luma intra prediction mode information determination method according to an embodiment.

Hereinafter, step S1910 of determining luma intra prediction mode information (e.g., lumaIntraPredMode) will be described in greater detail. FIG. 22 is a flowchart illustrating a method of determining luma intra prediction mode information by a decoding apparatus.

First, the decoding apparatus may identify whether an MIP mode applies to the luma block corresponding to the current chroma block (S2210). When the MIP mode applies to the luma block corresponding to the current chroma block, the decoding apparatus may set the value of luma intra prediction mode information to an INTRA_PLANAR mode (S2220).

Meanwhile, when the MIP mode does not apply to the luma block corresponding to the current chroma block, the decoding apparatus may identify whether an IBC mode or a PLT mode applies to the luma block corresponding to the current chroma block (S2230).

When the IBC mode or the PLT mode applies to the luma block corresponding to the current chroma block, the decoding apparatus may set the value of the luma intra prediction mode information to an INTRA_DC mode (S2240).

On the other hand, when the IBC mode or the PLT mode does not apply to the luma block corresponding to the current chroma block, the decoding apparatus may set the value of luma intra prediction mode information to the intra prediction mode of the luma block corresponding to the current chroma block (S2250).

In the determination process of the luma intra prediction mode information shown in FIG. 22, various methods are applicable in order to specify the luma block corresponding to the current chroma block. As described above, the top-left sample position of the current chroma sample may be expressed by relative coordinates of a luma sample spaced apart from the position of the top-left luma sample of the current picture. Hereinafter, a method of specifying a luma block corresponding to a chroma block in this background will be described.

Figure 23:
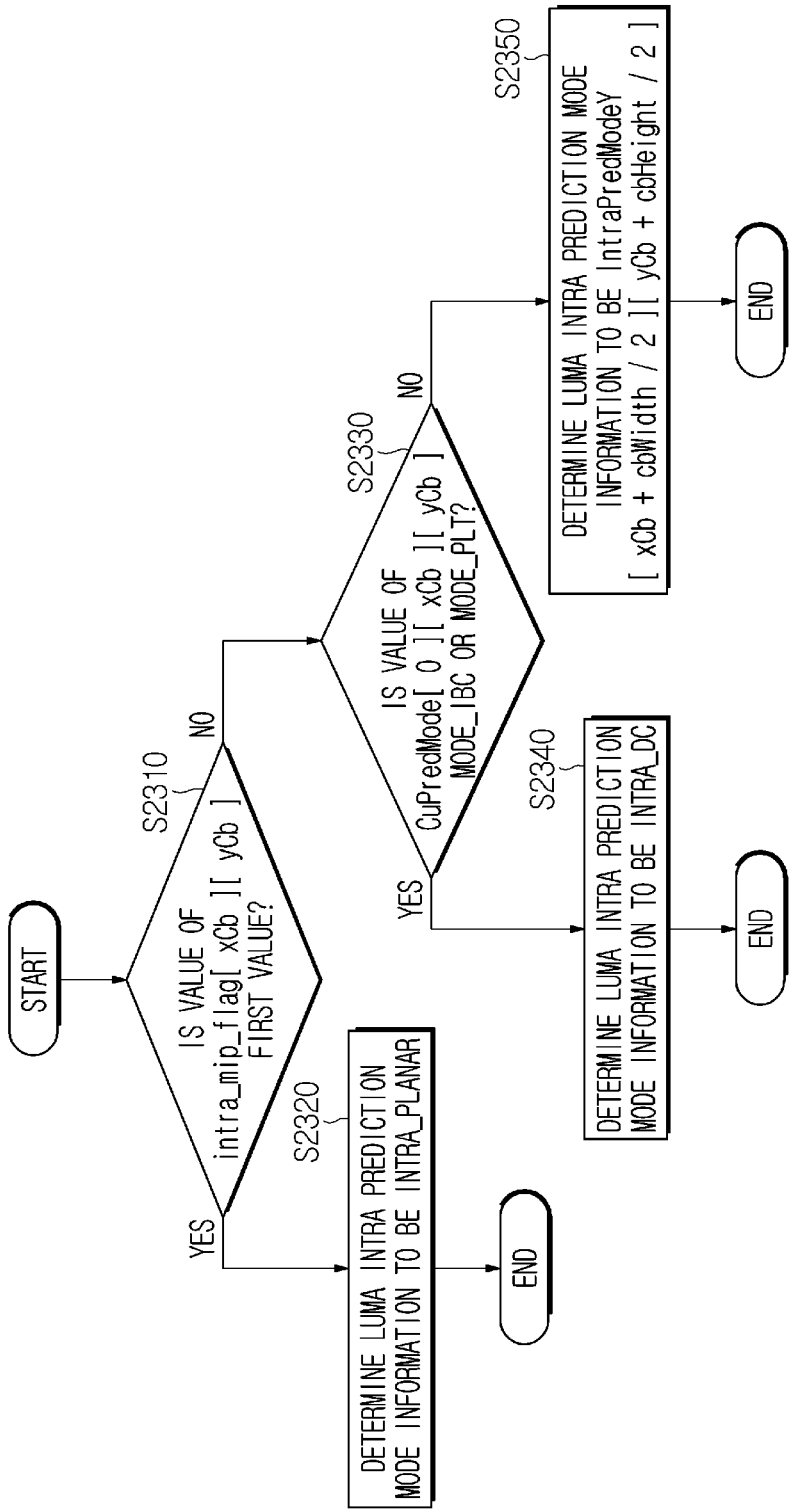

FIG. 23 is a view illustrating a first embodiment of referring to a luma sample position in order to identify a prediction mode of a luma block corresponding to a current chroma block. Hereinafter, since steps S2310 to S2350 correspond to steps S2210 to S2250 of FIG. 22, only a difference will be described.

In the first embodiment of FIG. 23, a first luma sample position corresponding to a top-left sample position of the current chroma block and a second luma sample position determined based on the top-left sample position of the current chroma block and the width and height of a current luma block are referred to. Here, the first luma sample position may be (xCb, yCb). In addition, the second luma sample position may be (xCb+cbWidth/2, yCb+cbHeight/2).

More specifically, in step S2310, in order to identify whether the MIP mode applies to the luma block corresponding to the current chroma block, the first luma sample position may be identified. More specifically, whether the value of a parameter intra_mip_flag[xCb][yCb] specifying whether to apply the MIP mode identified at the first luma sample position is 1 may be identified. A first value (e.g., 1) of intra_mip_flag[xCb][yCb] may specify that the MIP mode applies at a [xCb][yCb] sample position.

In addition, in step S2330, a first luma sample position may be identified in order to identify whether an IBC mode or a palette mode has applied to the luma block corresponding to the current chroma block. More specifically, whether the value of a prediction mode parameter CuPredMode[0][xCb][yCb] of a luma block identified at the first luma sample position is a value (e.g., MODE_IBC) specifying an IBC mode or a value (e.g., MODE_PLT) specifying a palette mode may be identified.

In addition, in step S2350, in order to set luma intra prediction mode information to the intra prediction mode information of the luma block corresponding to the current chroma block, a second luma sample position may be identified. More specifically, the value of a parameter IntraPredModeY[xCb+cbWidth/2] [yCb+cbHeight/2] speci-fying a luma intra prediction mode identified at a second luma sample position may be identified.

However, in the case of the first embodiment, in order to determine the intra prediction mode of the current chroma block, both the first luma sample position and the second luma sample position are considered. When only one luma sample position is considered, encoding and decoding complexity may decrease compared to the case where two sample positions are considered.

Figure 24:
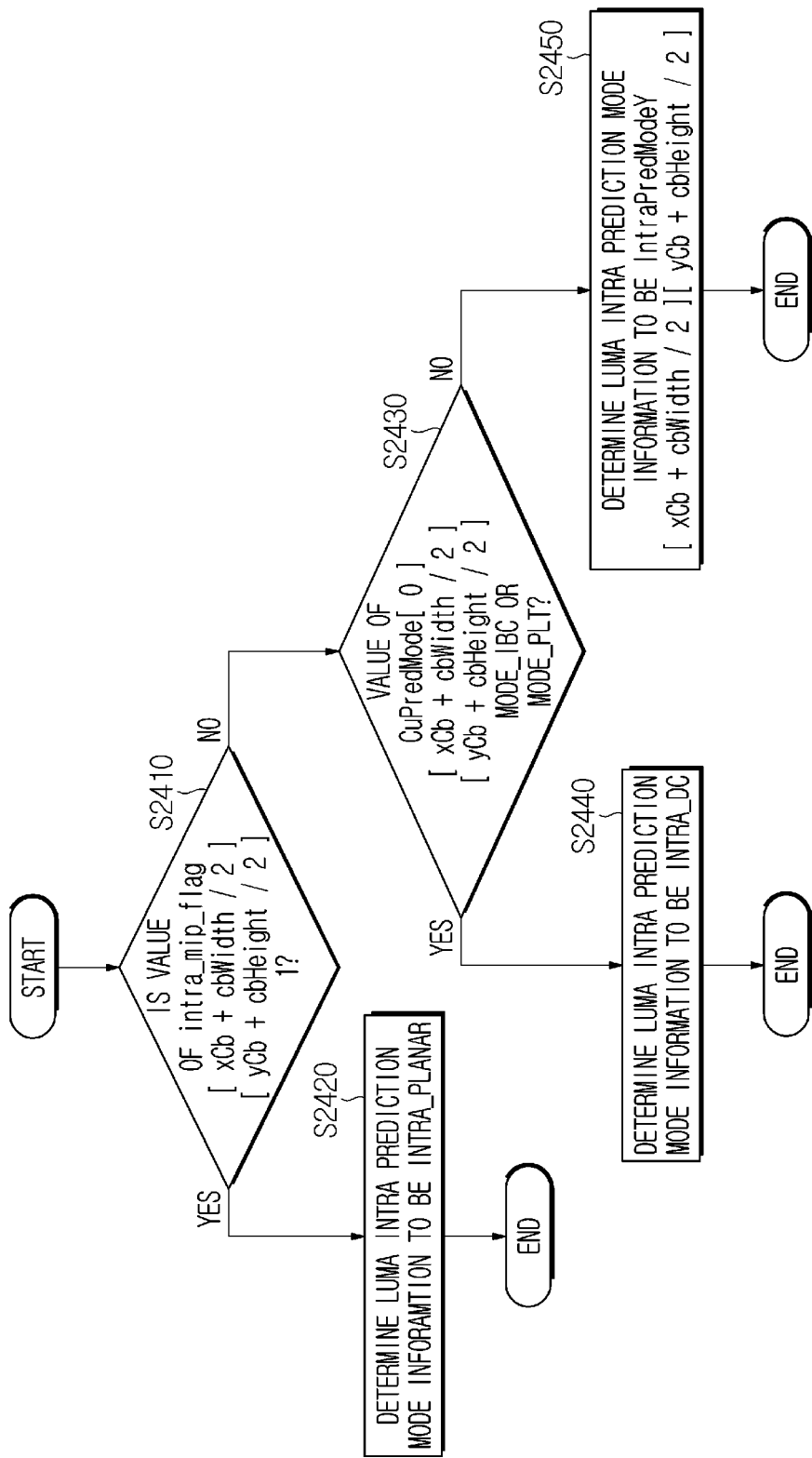
Figure 25:
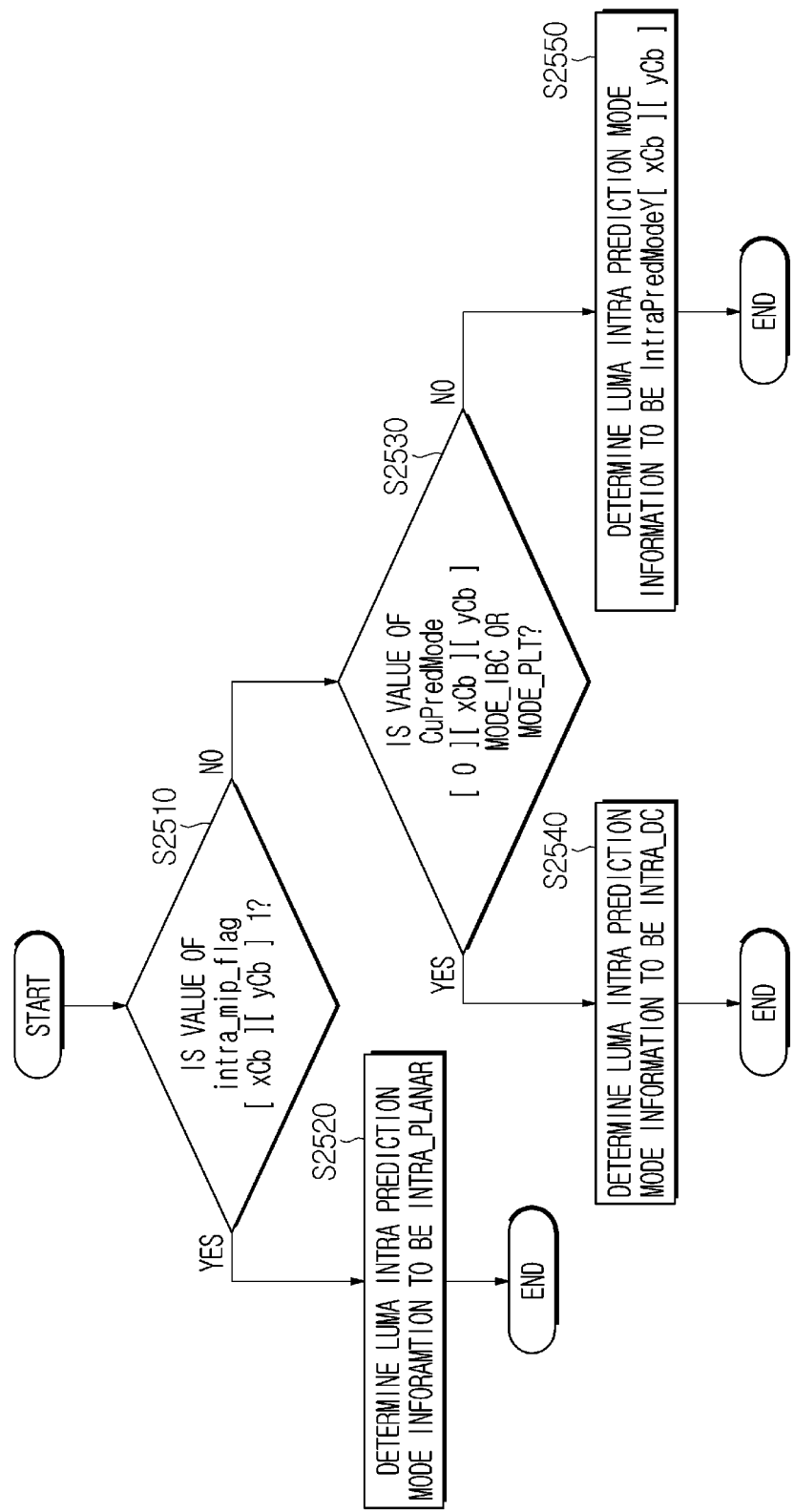

Hereinafter, a second embodiment and a third embodiment considering only one luma sample position will be described. FIGS. 24 and 25 are views illustrating a second embodiment and a third embodiment of referring a luma sample position in order to identify the prediction mode of the luma block corresponding to the current chroma block. Hereinafter, since steps S2410 to S2450 and steps S2510 to S2550 correspond to steps S2210 to S2250 of FIG. 22, only a difference will be described.

In the second embodiment of FIG. 24, the second luma sample position determined based on the top-left sample position of the current chroma block and the width and height of the current luma block may be referred to. Here, the second luma sample position may be (xCb+cbWidth/2, yCb+cbHeight/2). Therefore, in the second embodiment, a prediction value of a luma sample corresponding to a center position (xCb+cbWidth/2, yCb+cbHeight/2) of the luma block corresponding to the current chroma block may be identified. In an embodiment, when the luma block has even numbers of columns and rows, the center position may specify a bottom-right sample position of four central samples of the luma block.

More specifically, in step S2410, in order to identify whether the MIP mode has applied to the luma block corresponding to the current chroma block, the second luma sample position may be identified. More specifically, whether the value of a parameter intra_mip_flag[xCb+cbWidth/2][yCb+cbHeight/2] specifying whether to apply the MIP identified at the second luma sample position is 1 may be identified.

In addition, in step S2430, in order to identify whether the IBC or palette mode has applied to the luma block corresponding to the current chroma block, the second luma sample position may be identified. More specifically, whether the value of a prediction mode parameter CuPredMode[0][xCb+cbWidth/2] [yCb+cbHeight/2] of the luma block identified at the second luma sample position is a value (e.g., MODE_IBC) specifying the IBC mode or a value (e.g., MODE_PLT) specifying the palette mode may be identified.

In addition, in step S2450, in order to set luma intra prediction mode information to the intra prediction mode information of the luma block corresponding to the current chroma block, the second luma sample position may be identified. More specifically, the value of a parameter IntraPredModeY[xCb+cbWidth/2][yCb+cbHeight/2] specifying a luma intra prediction mode identified at the second luma sample position may be identified.

In the third embodiment of FIG. 25, the first luma sample position corresponding to the top-left sample position of the current chroma block may be referred to. Here, the first luma sample position may be (xCb, yCb). Therefore, in the third embodiment, the prediction value of the luma sample corresponding to the top-left sample position (xCb, yCb) of the luma block corresponding to the current chroma block may be identified. In an embodiment, when the luma block has even numbers of columns and rows, More specifically, in step S2510, in order to identify whether the MIP mode has applied to the luma block corresponding to the current chroma block, the first luma sample position may be identified. More specifically, whether the value of a parameter intra_mip_flag[xCb][yCb] specifying whether to apply the MIP mode identified at the first luma sample position is 1 may be identified.

In addition, in step S2530, the first luma sample position may be identified in order to identify whether the IBC or palette mode has applied to the luma block corresponding to the current chroma block. More specifically, whether the value of the prediction mode parameter CuPredMode[0][xCb][yCb] of the luma block identified at the first luma sample position is a value (e.g., MODE_IBC) specifying the IBC mode or a value (e.g., MODE_PLT) specifying the palette mode may be identified.

In addition, in step S2550, in order to set luma intra prediction mode information to the intra prediction mode information of the luma block corresponding to the current chroma block, the first luma sample position may be identified. More specifically, the value of a parameter IntraPredModeY[xCb][yCb] specifying the luma intra prediction mode identified at the first luma sample position may be identified.

Encoding and Decoding Method

Figure 26:
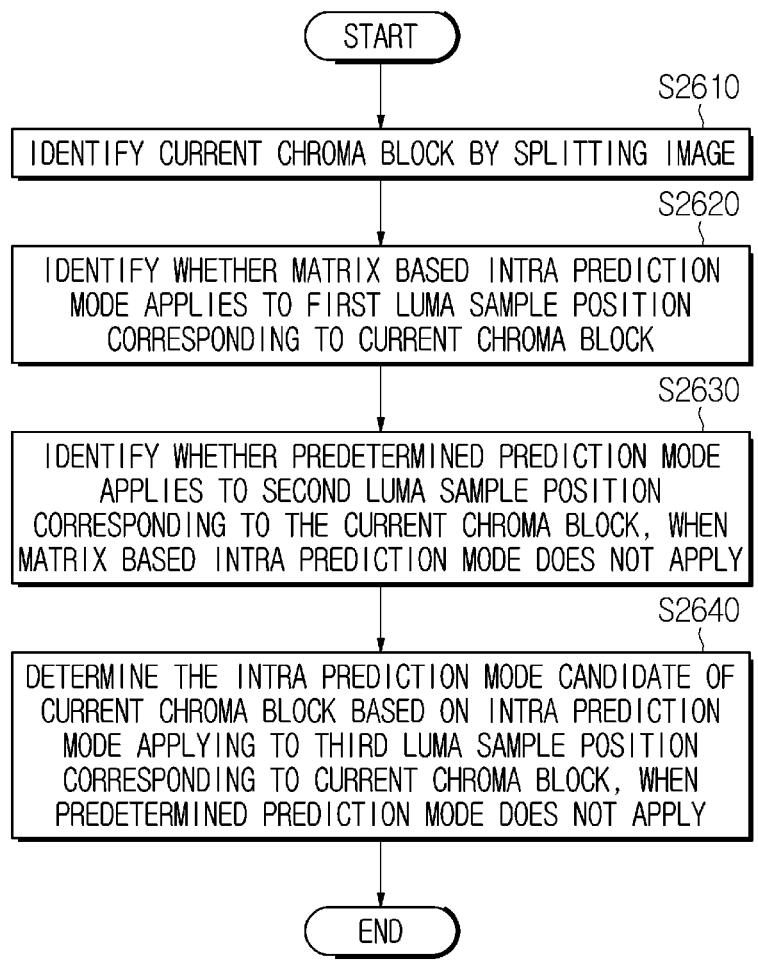
FIG. 26 is a flowchart illustrating a method of performing encoding and decoding according to an embodiment by an encoding apparatus and a decoding apparatus according to an embodiment.

Hereinafter, a method of performing encoding by an encoding apparatus and a method of performing decoding by a decoding apparatus according to an embodiment using the above-described method will be described with reference to FIG. 26. The encoding apparatus according to an embodiment may include a memory and at least one processor and may perform the following method by the at least one processor. In addition, the decoding apparatus according to an embodiment may include a memory and at least one processor and may perform the following method by the at least one processor. Although operation of the decoding apparatus will be described below for convenience of description, the following description is equally applicable to the encoding apparatus.

First, the decoding apparatus may identify a current chroma block by splitting an image (S2610). Next, the decoding apparatus may identify whether a matrix based intra prediction mode applies to a first luma sample position corresponding to the current chroma block (S2620). Here, the first luma sample position may be determined based on at least one of the width or height of the luma block corresponding to the current chroma block. For example, the first luma sample position may be determined based on a top-left sample position of the luma block corresponding to the current chroma block, the width of the luma block and the height of the luma block.

Next, when the matrix based intra prediction mode does not apply, the decoding apparatus may identify whether a predetermined prediction mode applies to a second luma sample position corresponding to the current chroma block (S2630). Here, the second luma sample position may be determined based on at least one of the width or height of the luma block corresponding to the current chroma block. For example, the second luma sample position may be determined based on the top-left sample position of the luma block corresponding to the current chroma block, the width of the luma block and the height of the luma block.

Next, when the predetermined prediction mode does not apply, the decoding apparatus may determine the intra prediction mode candidate of the current chroma block based on an intra prediction mode applying to a third luma sample position corresponding to the current chroma block (S2640). Here, the predetermined prediction mode may be an IBC (Intra Block Copy) mode or a palette mode.

Meanwhile, the first luma sample position may be the same as the third luma sample position. Alternatively, the second luma sample position may be the same as the third luma sample position. Alternatively, the first luma sample position, the second luma sample position and the third luma sample position may be the same.

Alternatively, the first luma sample position may be a center position of the luma block corresponding to the current chroma block. For example, the x component position of the first luma sample position may be determined by adding half the width of the luma block to the x component position of the top-left sample of the luma block corresponding to the current chroma block, and the y component position of the first luma sample position may be determined by adding half the height of the luma block to the y component position of the top-left sample of the luma block corresponding to the current chroma block.

Alternatively, the first luma sample position, the second luma sample position and the third luma sample position may be determined based on the top-left sample position of the luma block corresponding to the current chroma block, the width of the luma block and the height of the luma block, respectively.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 27:
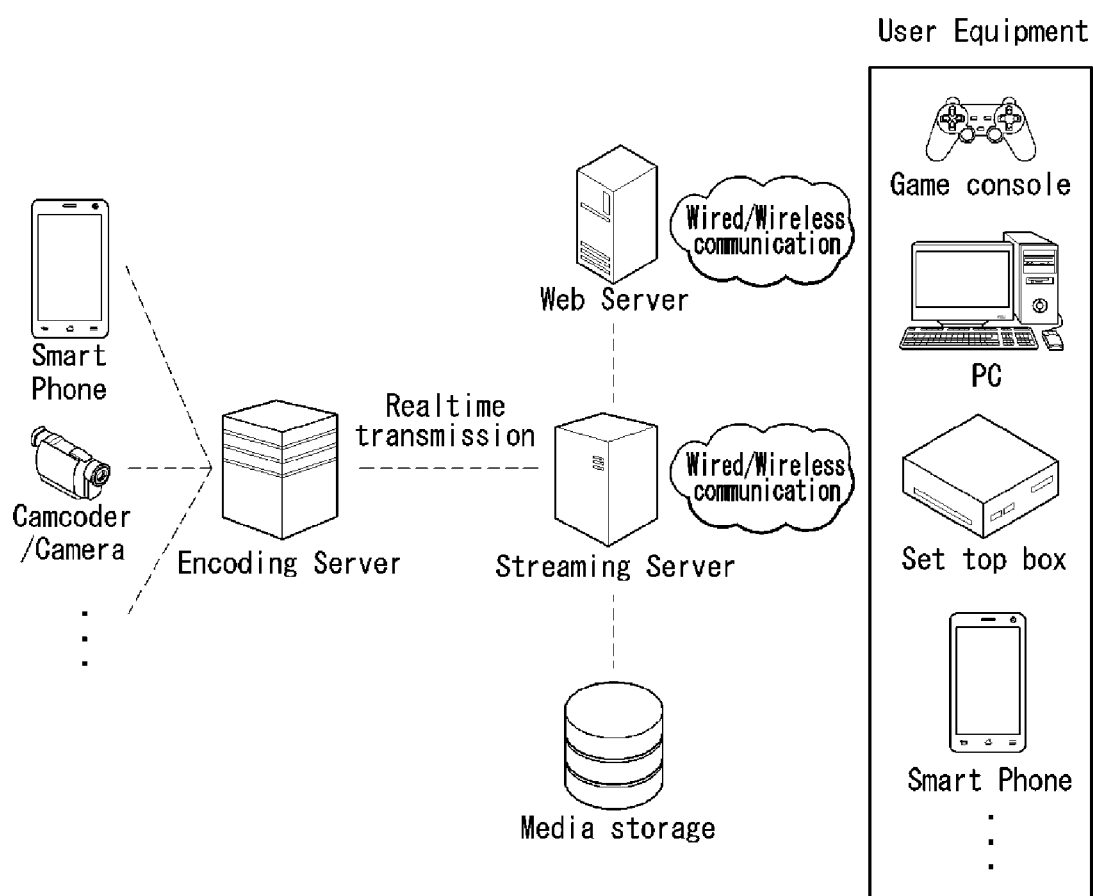
FIG. 27 is a view showing a content streaming system, to which an embodiment of the present disclosure is applicable.

FIG. 27 is a view showing a contents streaming system, to which an embodiment of the present disclosure is applicable.

As shown in FIG. 27, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
    identifying a current chroma block by splitting an image;
    determining a tree type of the current chroma block;
    identifying whether a matrix based intra prediction mode applies to a first luma sample position corresponding to the current chroma block, based on the tree type of the current chroma block being a dual tree;
    identifying whether a predetermined prediction mode applies to a second luma sample position corresponding to the current chroma block, based on the matrix based intra prediction mode not being applied; and
    determining an intra prediction mode candidate of the current chroma block based on an intra prediction mode applying to a third luma sample position corresponding to the current chroma block, based on the predetermined prediction mode not being applied.

2. The image decoding method of claim 1, wherein the first luma sample position is determined based on at least one of a width or height of a luma block corresponding to the current chroma block.

3. The image decoding method of claim 1, wherein the first luma sample position is determined based on a top-left sample position of a luma block corresponding to the current chroma block, a width of the luma block and a height of the luma block.

4. The image decoding method of claim 3, wherein the first luma sample position is the same as the third luma sample position.

5. The image decoding method of claim 1, wherein the second luma sample position is determined based on at least one of a width or height of a luma block corresponding to the current chroma block.

6. The image decoding method of claim 1, wherein the predetermined prediction mode is an IBC (intra block copy) mode or a palette mode.

7. The image decoding method of claim 1, wherein the second luma sample position is determined based on a top-left sample position of a luma block corresponding to the current chroma block, a width of the luma block and a height of the luma block.

8. The image decoding method of claim 7, wherein the second luma sample position is the same as the third luma sample position.

9. The image decoding method of claim 1, wherein the first luma sample position, the second luma sample position and the third luma sample position are the same.

10. The image decoding method of claim 9, wherein the first luma sample position is a center position of a luma block corresponding to the current chroma block.

11. The image decoding method of claim 9,
    wherein an x component position of the first luma sample position is determined by adding half the width of the luma block to an x component position of a top-left sample of a luma block corresponding to the current chroma block, and
    wherein a y component position of the first luma sample position is determined by adding half the height of the luma block to a y component position of the top-left sample of the luma block corresponding to the current chroma block.

12. The image decoding method of claim 9, wherein the first luma sample position, the second luma sample position and the third luma sample position are determined based on a top-left sample position of a luma block corresponding to the current chroma block, a width of the luma block and a height of the luma block, respectively.

13. An image encoding method performed by an image encoding apparatus, the image encoding method comprising:
    identifying a current chroma block by splitting an image;
    identifying whether a matrix based intra prediction mode applies to a first luma sample position corresponding to the current chroma block, based on a tree type of the current chroma block being a dual tree;
    identifying whether a predetermined prediction mode applies to a second luma sample position corresponding to the current chroma block, based on the matrix based intra prediction mode not being applied; and
    determining an intra prediction mode candidate of the current chroma block based on an intra prediction mode applying to a third luma sample position corresponding to the current chroma block, based on the predetermined prediction mode not being applied.

14. A method of transmitting a bitstream generated by an image encoding method, the image encoding method comprising:
    identifying a current chroma block by splitting an image;
    identifying whether a matrix based intra prediction mode applies to a first luma sample position corresponding to the current chroma block, based on a tree type of the current chroma block being a dual tree;
    identifying whether a predetermined prediction mode applies to a second luma sample position corresponding to the current chroma block, based on the matrix based intra prediction mode not being applied; and
    determining an intra prediction mode candidate of the current chroma block based on an intra prediction mode applying to a third luma sample position corresponding to the current chroma block, based on the predetermined prediction mode not being applied.

15. A non-transitory computer-readable recording medium storing a bitstream generated by the image encoding method of claim 13.

* * * * *